(12) United States Patent
Dong (10) Patent No.: US 9,469,391 B1
(45) Date of Patent: Oct. 18, 2016

(54) ADAPTIVE WING FOR AN AIRCRAFT (71) Applicant: The Boeing Company, Chicago, IL (US)

(72) Inventor: Jian Dong, Irvine, CA (US)

(73) Assignee: THE BOEING COMPANY, Chicago, IL (US)

( * ) Notice: Subject to any disclaimer, the term of this patent is extended or adjusted under 35 U.S.C. 154(b) by 650 days.

(21) Appl. No.: 13/871,296

(22) Filed: Apr. 26, 2013

(51) Int. Cl.
*B64C 3/56* (2006.01)
*B64C 3/38* (2006.01)
*B64C 3/54* (2006.01)
*B64C 23/06* (2006.01)
*B64C 9/34* (2006.01)

(52) U.S. Cl.
CPC .............. *B64C 3/56* (2013.01); *B64C 3/385* (2013.01); *B64C 3/54* (2013.01); *B64C 3/546* (2013.01); *B64C 23/065* (2013.01); *B64C 9/34* (2013.01)

(58) Field of Classification Search
CPC .......... B64C 3/38; B64C 3/385; B64C 3/54; B64C 3/546; B64C 3/56; B64C 5/08; B64C 9/34; B64C 23/065
See application file for complete search history.

(56) References Cited

U.S. PATENT DOCUMENTS

| | | | |
|---|---|---|---|
| 4,824,053 A | 4/1989 | Sarh | |
| 6,345,790 B1* | 2/2002 | Brix | B64C 23/065 244/199.4 |
| 6,834,835 B1 | 12/2004 | Knowles et al. | |
| 7,744,038 B2 | 6/2010 | Sankrithi et al. | |
| 2002/0066831 A1* | 6/2002 | Ngo | B64C 23/065 244/199.3 |
| 2004/0000619 A1* | 1/2004 | Barriety | B64C 3/52 244/219 |
| 2006/0027703 A1* | 2/2006 | Bussom | B64C 23/065 244/17.13 |
| 2010/0084516 A1 | 4/2010 | Eberhardt | |
| 2011/0001016 A1* | 1/2011 | Skillen | B64C 3/40 244/218 |

* cited by examiner

*Primary Examiner* — Nicholas McFall (57) ABSTRACT

An adaptive wing for an aircraft includes a first wing portion, a second wing portion, and a third wing portion. The second wing portion is telescopically attached to the first wing portion to selectively change an overall length of the wing based on real-time flight conditions or airport space constraints. The third wing portion is rotate-ably attached to one end of the second wing portion, and a dihedral angle between the second wing portion and the third wing portion is changeable based on real-time flight conditions or airport space constraints.

13 Claims, 6 Drawing Sheets

ADAPTIVE WING FOR AN AIRCRAFT

FIELD OF THE DISCLOSURE

This disclosure relates to an adaptive wing for an aircraft which is adjustable in overall length or in orientation, or in the combination of the overall length and orientation.

BACKGROUND

Wings of aircraft are typically fixed in a configuration that cannot be changed at the airport terminal or during flight. The fixed configuration is typically designed with the consideration of only one or a few flight conditions which significantly reduces the benefits that may be achieved at different flight conditions. During certain flight conditions, this fixed configuration may result in increased drag and decreased lift which may lead to a significant increase in fuel consumption, may result in decreased payloads and flight-ranges, may lead to increased noise and emissions, or which may lead to one or more other issues. In addition, the overall length of the wings of the aircraft is limited by airport terminal space and ground clearance requirements in the airport. This may further reduce the wing designs which may be used in the aircraft.

An aircraft wing and method for its use is needed to overcome one or more of the issues experienced by one or more of the existing aircraft wing configurations.

SUMMARY

In one embodiment, a wing for an aircraft is disclosed. The wing includes a first wing portion and a second wing portion. The second wing portion is telescopically attached to the first wing portion to selectively change an overall length of the wing.

In another embodiment, a wing for an aircraft is disclosed. The wing includes at least one winglet rotate-ably attached to the wing.

In yet another embodiment, a method of changing a length of a wing of an aircraft during operation of the aircraft is disclosed. In one step, a second wing portion of a wing of an aircraft is telescopically moved relative to a first wing portion of the wing of the aircraft to selectively change an overall length of the wing.

In still another embodiment, a method of moving a wing of an aircraft during operation of the aircraft is disclosed. In one step, at least one winglet, attached with a wing of the aircraft, is rotated relative to the wing.

In still another embodiment, a method of changing a wing configuration of an aircraft during operation of the aircraft is disclosed. In one step, a length of a wing and a dihedral angle between a winglet and the wing change simultaneously.

The scope of the present disclosure is defined solely by the appended claims and is not affected by the statements within this summary.

BRIEF DESCRIPTION OF THE DRAWINGS

The disclosure can be better understood with reference to the following drawings and description. The components in the figures are not necessarily to scale, emphasis instead being placed upon illustrating the principles of the disclosure.

DETAILED DESCRIPTION

Figure 1:
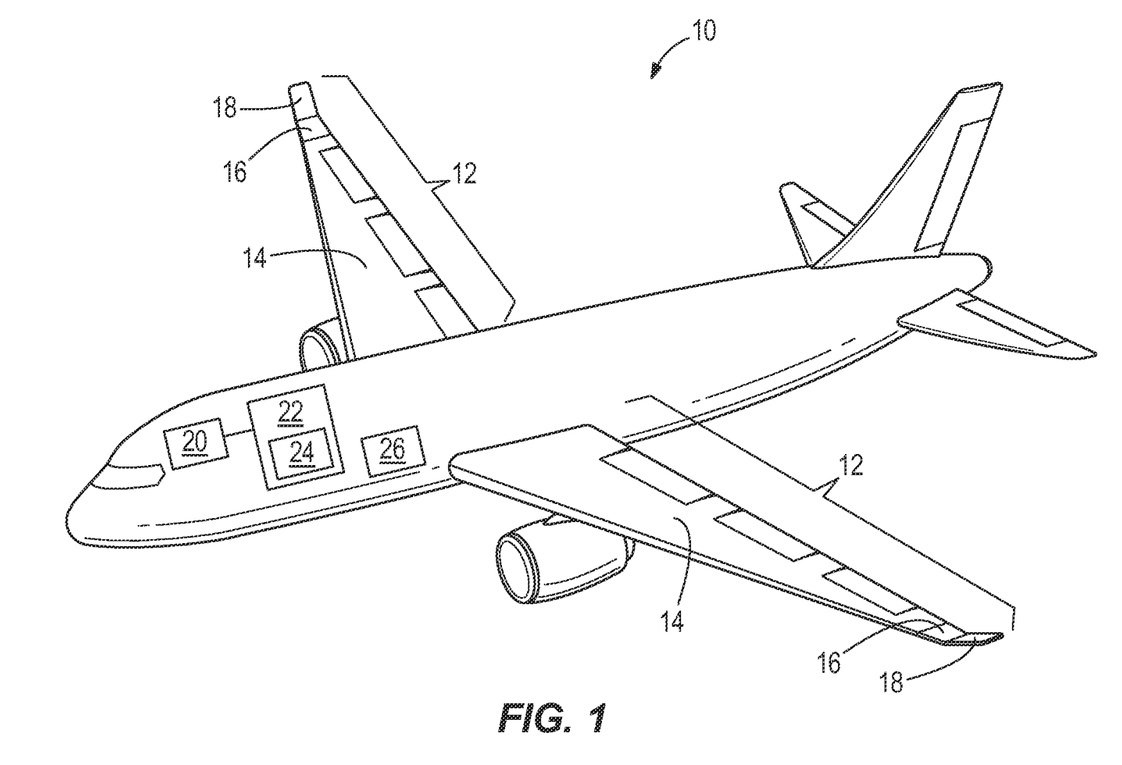
FIG. 1 illustrates a perspective view of one embodiment of an aircraft having an adaptive wing system.

FIG. 1 illustrates a perspective view of one embodiment of an aircraft 10 having an adaptive wing system. The aircraft 10 comprises two wings 12. Each of the wings 12 comprises a first wing portion 14, a second wing portion 16, and a third wing portion 18. The second wing portion 16 is telescopically attached to the first wing portion 14, and the wing portion 16 can be moved in and out of the wing portion 16. The third wing portion 18 is hinged to the second wing portion 16, and the wing portion 18 can be rotated. In other embodiments, the first wing portion 14, the second wing portion 16, and the third wing portion 18 may be jointed in varying configurations or orientations. The first wing portion 14 comprises a main portion of the wing 12. The second wing portion 16 comprises a base portion of the wing 12. The third wing portion 18 comprises a winglet of the wing 12. The aircraft 10 comprises a processor 20. A memory 22 is in electronic communication with the processor 20. The memory 22 contains programming code 24 for execution by the processor 20. In other embodiments, the aircraft 10 may contain any number of processors. The aircraft 10 further comprises one or more sensors 26.

Figure 2:
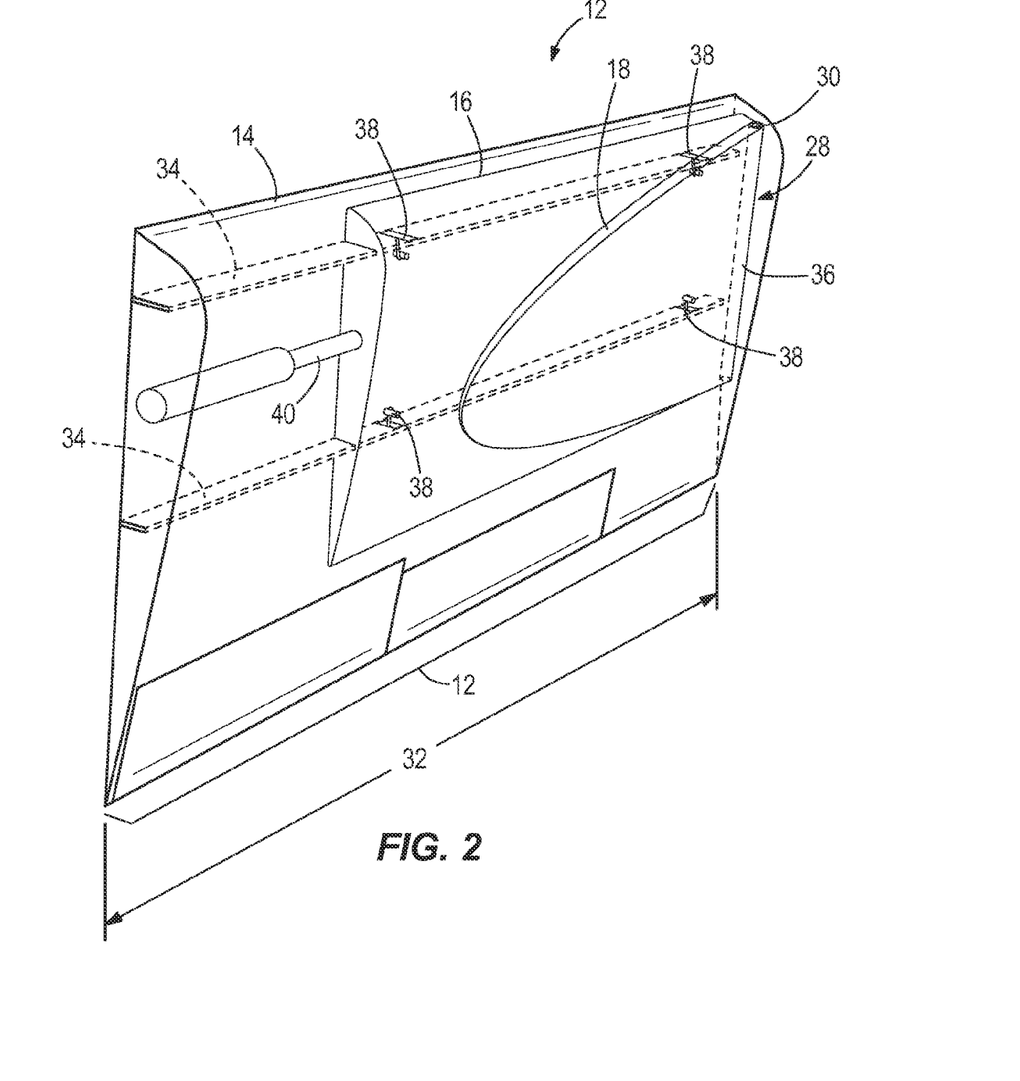
FIG. 2 illustrates a perspective view of one of the wings of the embodiment of FIG. 1 removed from the aircraft with a second wing portion and a third wing portion in a first position relative to one another and to a first wing portion.

FIG. 2 illustrates a perspective view of one of the wings 12 of the embodiment of FIG. 1 removed from the aircraft 10 with the second wing portion 16 and the third wing portion 18 disposed in a first position relative to one another and to the first wing portion 14. In the first position, the second wing portion 16 is completely retracted within a cavity 28 of the first wing portion 14. The third wing portion 18 is rotate-ably disposed against and parallel to the second wing portion 16 with a dihedral angle 30 between the third wing portion 18 and the second wing portion of zero (0) degrees. In the first position, the wing 12 has an overall length 32. The aircraft 10 may have the wing configuration of FIG. 2 when the aircraft 10 is in an airport terminal, or in storage and space is limited. In other embodiments, in the first position one or more of the second wing portion 16 or the third wing portion 18 may only be partially disposed in the cavity 28 of the first wing portion 14 with the wing 12 having a varying overall length 32. In still other embodiments, in the first position the second wing portion 16 and the third wing portion 18 may be disposed in a variety of orientations or configurations relative to one another and to the first wing portion 14 with the wing 12 having a further varying overall length 32.

The second wing portion 16 is moveably attached to the first wing portion 14 with connection members 34. The connection members 34 comprise rails. In other embodiments, the connection members 34 may comprise any number, type, orientation, and configuration of connection members. The third wing portion 18 is rotate-ably attached to the second wing portion 16 at a rotating joint 36. In other embodiments, the third wing portion 18 may be attached to the second wing portion 16 using varying attachment devices. Locking members 38 lock the second wing portion 16 and the third wing portion 18 in place within the cavity 28 of the first wing portion 14. The locking members 38 may comprise latches, locks, fasteners, or any type of locking members. In other embodiments, the locking members 38 may comprise any number, type, orientation, and configuration of locking members.

Figure 3:
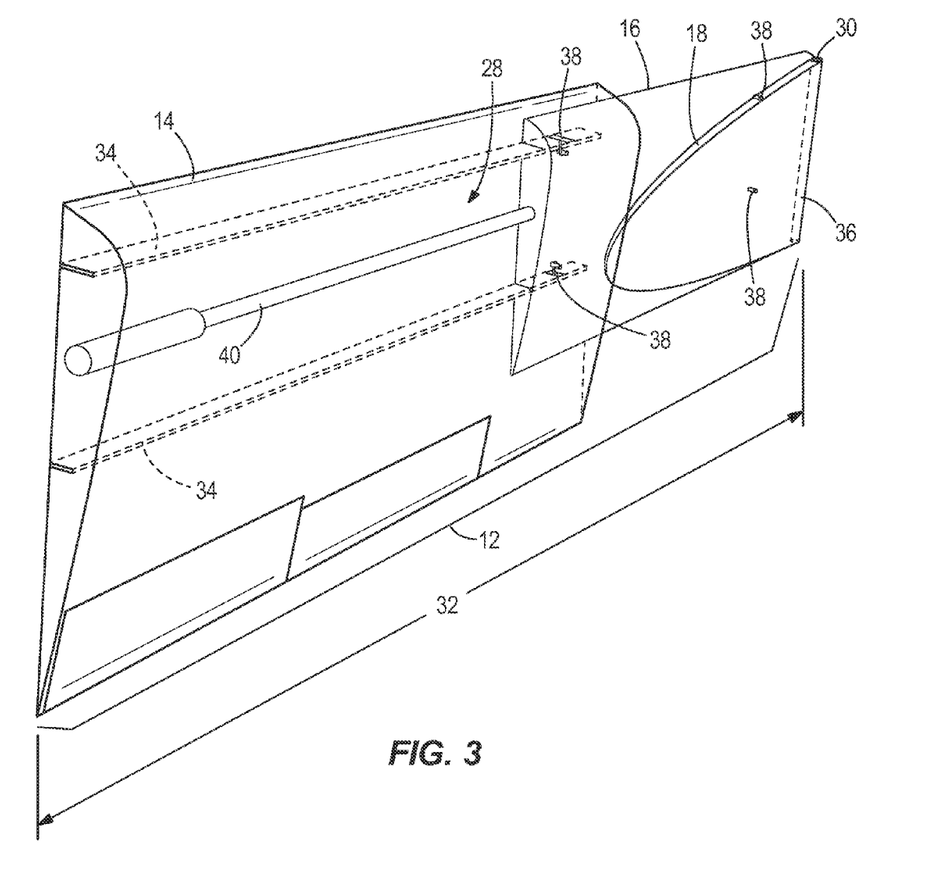
FIG. 3 illustrates a perspective view of the wing of FIG. 2 removed from the aircraft with the second wing portion and the third wing portion having been telescopically moved to a second position with an actuator relative to one another and to the first wing portion.

FIG. 3 illustrates a perspective view of the wing 12 of FIG. 2 removed from the aircraft 10 of FIG. 1 with the second wing portion 16 and the third wing portion 18 having been telescopically moved to a second position with an actuator 40 relative to one another and to the first wing portion 14. The actuator 40 is in electronic communication with the processor 20 of FIG. 1. The actuator 40 is controlled by the processor 20 of FIG. 1 using the programming code 24 contained in the memory 22 of FIG. 1 to control the overall length 32 of the wing 12 by moving the second wing portion 16 and the third wing portion 18 relative to the first wing portion 14. The programming code 24 may use a closed loop code in which the overall length 32 of the wing 12 is changed based on real-time parameters which are determined using the sensors 26 of FIG. 1 or using other devices. In another embodiment, the programming code 24 may use an open loop code in which the overall length 32 of the wing 12 is changed a pre-determined amount based on real-time parameters determined using the sensors 26 of FIG. 1 or using other devices.

The real-time parameters determined using the sensors 26 of FIG. 1, or determined using other devices, may comprise: a speed of the aircraft 10; an altitude of the aircraft 10; a location of the aircraft 10; a wind measurement; an angle of attack measurement; a fuel burning rate measurement; a wing bending moment measurement; a lift distribution measurement; an aircraft weight measurement; a thrust-to-weight ratio measurement; or another type of measurement. The programming code may be programmed to dispose the wings 12 in the first position of FIG. 2 when the aircraft 10 is in storage to conserve space, and to dispose the wings 12 in the second position of FIG. 3 when the aircraft 10 is about to take-off or at some point in flight.

Prior to the second wing portion 16 and the third wing portion 18 having been moved by the actuator 40 from the first position of FIG. 2 to the second position of FIG. 3, the locking members 38 were unlocked. The second wing portion 16 was then slid linearly along the first wing portion 14 with the connection members 34 to slide the second wing portion 16, and the attached third wing portion 18, at least partially out of the cavity 28 of the first wing portion 14. The locking members 38 were then used to lock the second wing portion 16 and the third wing portion 18 in place relative to one another and to the first portion 14.

In the second position, the second wing portion 16 and the third wing portion 18 are extended at least partially out of the cavity 28 of the first wing portion 14. In the second position, the third wing portion 18 is rotate-ably disposed against and parallel to the second wing portion 16 with a dihedral angle 30 between the third wing portion 18 and the second wing portion of zero (0) degrees. In the second position, the wing 12 has a larger overall length 32 than the wing 12 had in the first position of FIG. 2. In other embodiments, in the second position the second wing portion 16 and the third wing portion 18 may be disposed in a variety of orientations or configurations relative to one another and to the first wing portion 14 with the wing 12 having a further varying overall length 32.

Figure 4:
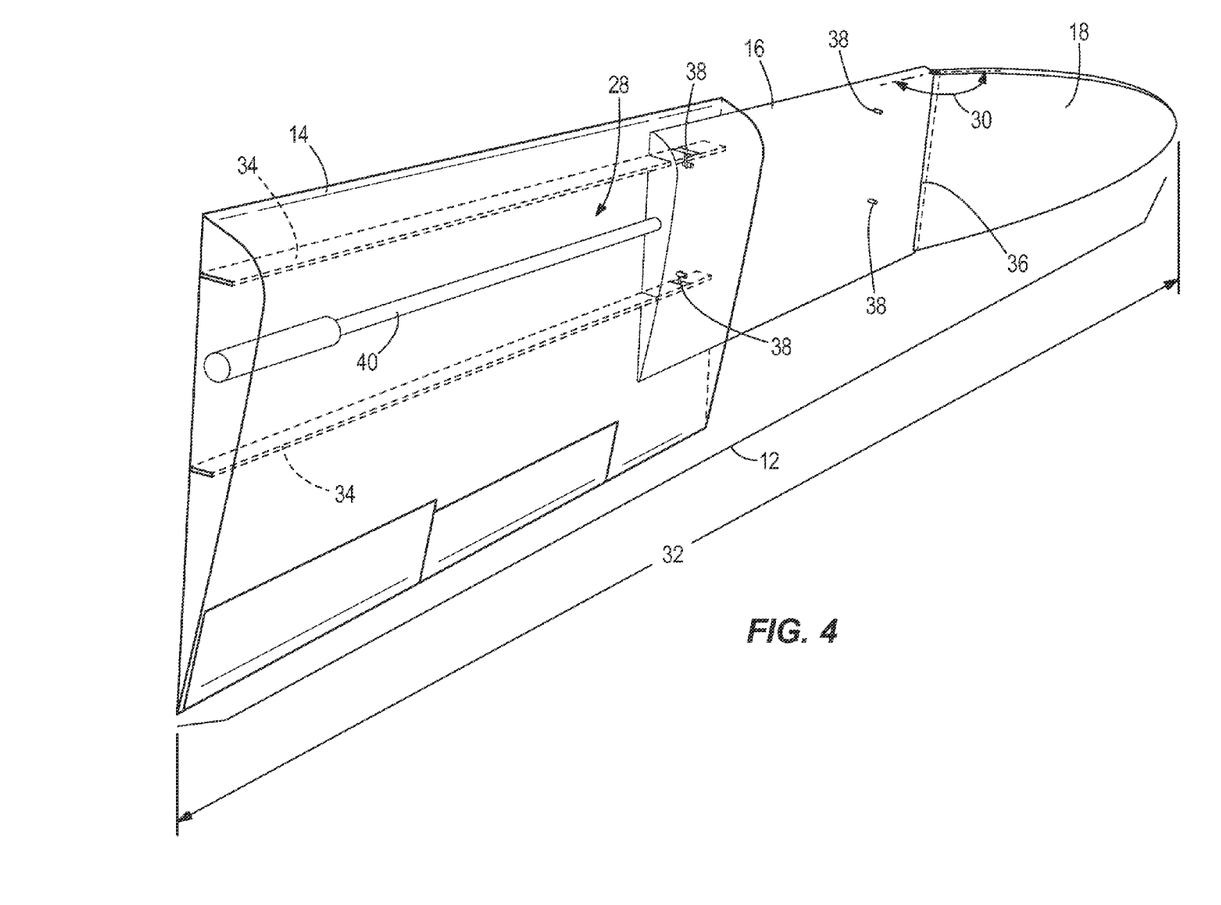
FIG. 4 illustrates a perspective view of the wing of FIG. 3 removed from the aircraft with the second wing portion and the third wing portion having been moved to a third position with the actuator relative to one another and to the first wing portion.

FIG. 4 illustrates a perspective view of the wing 12 of FIG. 3 removed from the aircraft 10 of FIG. 1 with the second wing portion 16 and the third wing portion 18 having been moved to a third position with the actuator 40 relative to one another and to the first wing portion 14. The actuator 40 is controlled by the processor 20 of FIG. 1 using the programming code 24 contained in the memory 22 of FIG. 1 to control the overall length 32 of the wing 12 by moving the second wing portion 16 and the third wing portion 18 relative to the first wing portion 14. The actuator 40 is further controlled by the processor 20 of FIG. 1 using the programming code 24 contained in the memory 22 of FIG. 1 to control the rotation of the third wing portion 18 relative to the second wing portion 16. The programming code 24 may be programmed to dispose the second wing portion 16 and the third wing portion 18 in the most efficient positions relative to the first wing portion 14 and to each other while the aircraft 10 of FIG. 1 is in-flight. This may result in a reduction in induced drag, an increase in lift, a significant reduction in fuel consumption, increased payloads and flight-ranges, reduced noise or emissions, or one or more other benefits.

The programming code 24 of FIG. 1 may use a closed loop code in which the overall length 32 of the wing 12 and the rotation of the third wing portion 18 relative to the second wing portion 16 is changed based on real-time parameters which are determined using the sensors 26 of FIG. 1 or using other devices. In another embodiment, the programming code 24 of FIG. 1 may use an open loop code in which the overall length 32 of the wing 12 and the rotation of the third wing portion 18 relative to the second wing portion 16 is changed a determined amount based on real-time parameters determined using the sensors 26 of FIG. 1 or using other devices.

The real-time parameters determined using the sensors 26 of FIG. 1, or determined using other devices, may comprise: a speed of the aircraft 10; an altitude of the aircraft 10; a location of the aircraft 10; a wind measurement; an angle of attack measurement; a fuel burning rate measurement; a wing bending moment measurement; a lift distribution measurement; an aircraft weight measurement; a thrust-to-weight ratio measurement; or another type of measurement. The programming code 24 of FIG. 1 may be programmed to dispose the wings 12 in the third position of FIG. 4 when the aircraft 10 of FIG. 1 is about to take-off or at some point in flight.

Prior to the second wing portion 16 and the third wing portion 18 having been moved by the actuator 40 from the second position of FIG. 3 to the third position of FIG. 4, the locking members 38 were unlocked. The third wing portion 18 was then rotated at the rotating joint 36 relative to the second wing portion 16. The locking members 38 were then used to lock the second wing portion 16 and the third wing portion 18 in place relative to one another and to the first portion 14.

In the third position, the second wing portion 16 and the third wing portion 18 are extended at least partially out of the cavity 28 of the first wing portion 14. In the third position, the third wing portion 18 is rotate-ably disposed away-from and non-parallel to the second wing portion 16 with a dihedral angle 30 between the third wing portion 18 and the second wing portion 16. In other embodiments, the third wing portion 18 may be rotated relative to the second wing portion 16 to have a dihedral angle 30 between the third wing portion 18 and the second wing portion 16 in an adjustable range of zero (0) degrees to 360 degrees. In the third position, the wing 12 may have an identical overall length 32 as the wing 12 had in the second position of FIG. 3 but the third wing portion 18 may have been rotated away from and non-parallel to the second wing portion 16. In other embodiments, in the third position the wing 12 may have a varying overall length 32 and the third wing portion 18 may be rotated a varying amount relative to the second wing portion 16 which may increase the overall length 32 of the wing 12.

Figure 5:
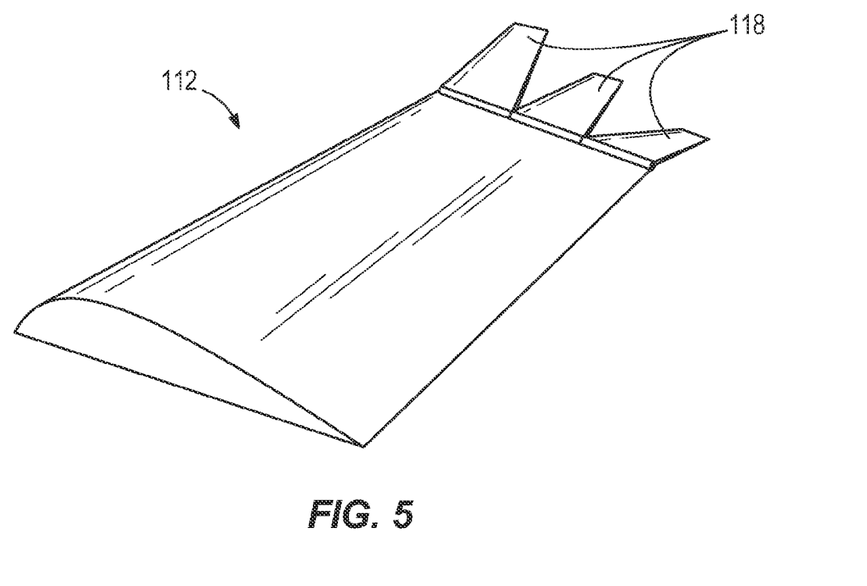
FIG. 5 illustrates a perspective view one embodiment of a portion of a wing having a plurality of winglets rotate-ably attached to the wing.
Figure 6:
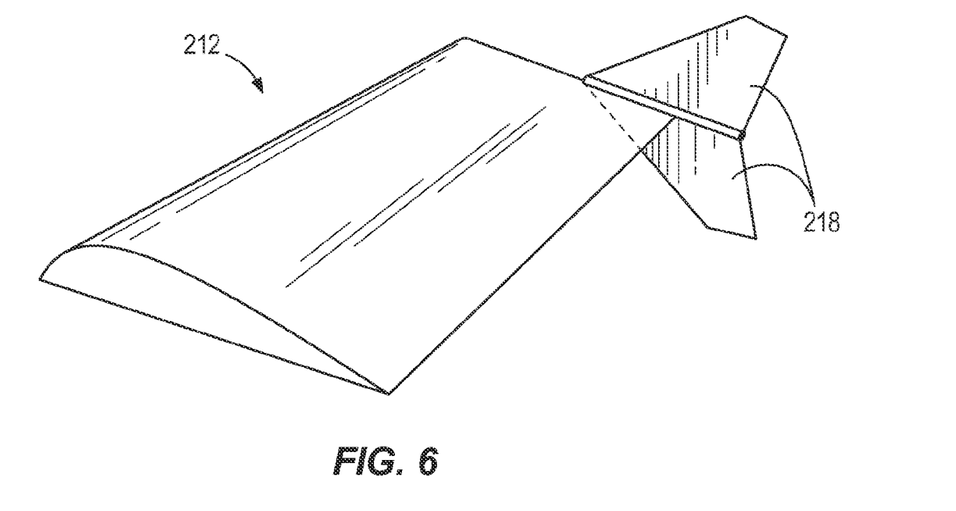
FIG. 6 illustrates a perspective view of another embodiment of a portion of a wing having a plurality of winglets rotate-ably attached to the wing.

FIG. 5 illustrates a perspective view one embodiment of a portion of a wing 112 having a plurality of winglets 118 rotate-ably attached to the wing 112. FIG. 6 illustrates a perspective view of another embodiment of a portion of a wing 212 having a plurality of winglets 218 rotate-ably attached to the wing 212. As shown in FIGS. 5 and 6, any number of winglets 118 and 218 may be rotate-ably attached to the wing 112 and 212 in any type of orientation or configuration.

Figure 7:
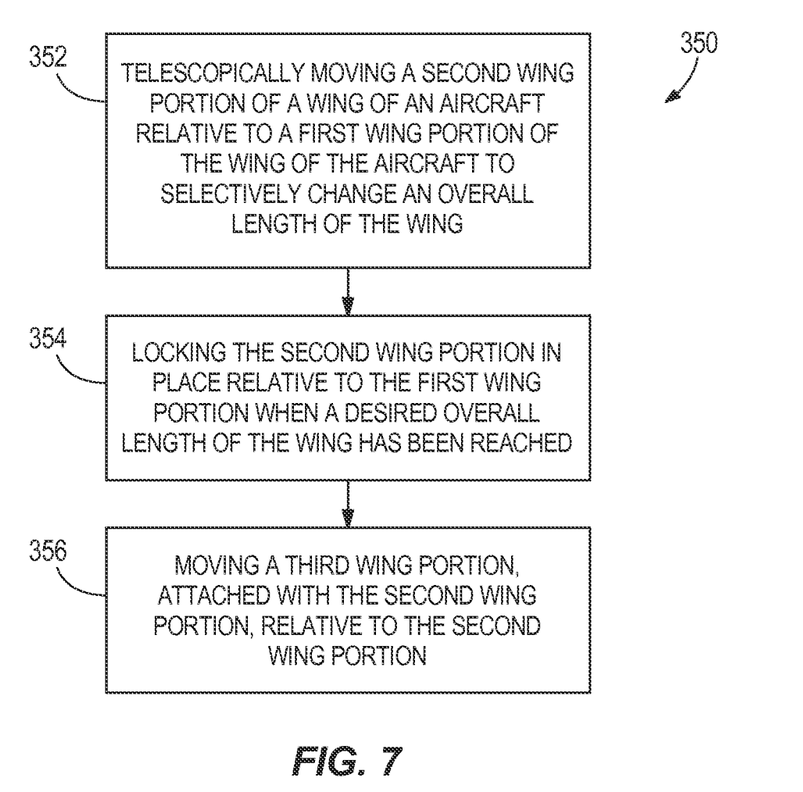
FIG. 7 is a flowchart illustrating one embodiment of a method of changing a length of a wing of an aircraft during operation of the aircraft.

FIG. 7 is a flowchart illustrating one embodiment of a method 350 of changing a length of a wing of an aircraft during operation of the aircraft. In step 352, a second wing portion of a wing of an aircraft is telescopically moved relative to a first wing portion of the wing of the aircraft to selectively change an overall length of the wing. In one embodiment, step 352 may further comprise moving the second wing portion out of a cavity of the first wing portion. In another embodiment, step 352 may comprise a processor using a closed-loop program to change the overall length of the wing based on detected real-time flight conditions, airport space constraints, or on other factors. In still another embodiment, step 352 may comprise a processor using an open-loop programming code to change the overall length of the wing a pre-determined amount based on real-time parameters such as detected real-time flight conditions, airport space constraints, or other factors. In yet another embodiment, step 352 may comprise retracting the second wing portion relative to the first wing portion when the aircraft is stored to shorten the overall length of the wing, and extending the second wing portion relative to the first wing portion when the aircraft takes-off or is flying to lengthen the overall length of the wing.

In step 354, the second wing portion may be locked in place relative to the first wing portion when a desired overall length of the wing has been reached. In step 356, a third wing portion, attached with the second wing portion, may be moved relative to the second wing portion. In one embodiment, step 356 may comprise rotating at least one winglet, attached to a base portion of the wing, relative to the base portion of the wing. In another embodiment, step 356 may comprise a processor using a closed-loop programming code to rotate at least one winglet relative to a base portion of the wing based on detected real-time conditions, airport space constraints, or other factors. In still another embodiment, step 356 may comprise a processor using an open-loop programming code to rotate at least one winglet relative to a base portion of the wing a pre-determined amount based on detected real-time conditions, airport space constraints, or other factors. In other embodiments, one or more steps of the method 350 may be modified in order or in substance, may not be followed, or one or more additional steps may be followed.

Figure 8:
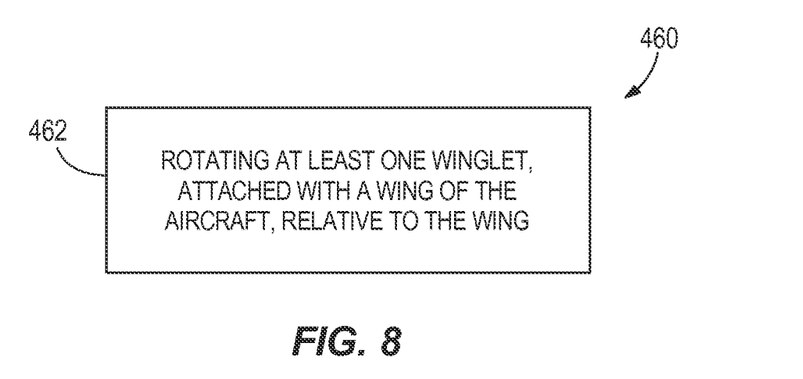
FIG. 8 is a flowchart illustrating one embodiment of a method of moving a wing of an aircraft during operation of the aircraft.

FIG. 8 is a flowchart illustrating one embodiment of a method 460 of moving a wing of an aircraft during operation of the aircraft. In step 462, at least one winglet, attached with a wing of the aircraft, may be rotated relative to the wing. In one embodiment, step 462 may further comprise rotating the at least one winglet from one position disposed against and parallel to the wing to another position disposed in a non-parallel position relative to the wing. In another embodiment, step 462 may further comprise rotating the at least one winglet to have a dihedral angle between the at least one winglet and the wing in a range of zero (0) degrees to 360 degrees. In still another embodiment, step 462 may further comprise rotating a plurality of winglets, attached with the wing, relative to the wing. In an additional embodiment, step 462 may further comprise a processor using a closed-loop programming code to rotate the at least one winglet relative to the wing a pre-determined amount based on detected real-time flight conditions, airport space constraints, or on other factors. In yet another embodiment, step 462 may further comprise a processor using an open-loop programming code to rotate the at least one winglet relative to the wing a non-pre-determined amount based on detected real-time flight conditions, airport space constraints, or on other factors. In other embodiments, one or more steps of the method 460 may be modified in order or in substance, may not be followed, or one or more additional steps may be followed.

One or more embodiments of the disclosure may result in a reduction in induced drag, an increase in lift, a significant reduction in fuel consumption, increased payloads and flight-ranges, reduced noise or emissions, or one or more other benefits.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the disclosure is defined by the appended claims. Accordingly, the disclosure is not to be restricted except in light of the appended claims and their equivalents.

The invention claimed is:

1. A wing for an aircraft comprising:
a first wing portion and a second wing portion, wherein the second wing portion is telescopically attached to the first wing portion, wherein the second wing portion is selectively movable between a first position and a second position to change a length of the wing, and wherein the second wing portion is completely retracted within a cavity in the first wing portion in the first position; and
at least one winglet rotate-ably attached to the second wing portion, wherein the at least one winglet is rotate-able relative to the second wing portion to have a dihedral angle between the at least one winglet and the wing in an adjustable range of 0 degrees to 360 degrees, and wherein the at least one winglet is retracted within the cavity when the second wing portion is in the first position and the at least one winglet is disposed against the second wing portion.

2. The wing of claim 1 further comprising a plurality of winglets rotate-ably attached to the second wing portion.

3. The wing of claim 1 further comprising at least one actuator for rotating the at least one winglet relative to the second wing portion.

4. The wing of claim 3 further comprising a processor in electronic communication with the actuator, and a memory in electronic communication with the processor, wherein the memory contains programming code for execution by the processor, and the programming code is configured to control the rotation of the at least one winglet relative to the second wing portion.

5. The wing of claim 4 wherein the programming code uses a closed loop code in which the rotation of the at least one winglet relative to the second wing portion is changed based on real-time parameters or airport space constraints.

6. The wing of claim 4 wherein the programming code uses an open loop code in which the rotation of the at least one winglet relative to the wing is changed a predetermined amount based on real-time parameters or airport space constraints.

7. The wing of claim 1, wherein the at least one winglet is adapted to rotate to a second position disposed in a non-parallel position relative to the second wing portion.

8. The wing of claim 1, wherein the at least one winglet is operable to rotate to a third position different from the first position and the second position.

9. A method of moving a wing of an aircraft during operation of the aircraft comprising:
telescopically moving a second wing portion from a first position to a second position relative to a first wing portion such that:
the second wing portion moves from a retracted position in a cavity in the first wing portion to an extended position to selectively increase a length of the wing; and
an at least one rotatable winglet that is rotate-ably attached to the second wing portion moves from a contained position within the cavity to an uncontained position; and
rotating the at least one winglet relative to the second wing portion when the at least one winglet is in the uncontained position, wherein the rotating the at least one winglet relative to the second wing portion further comprises rotating the at least one winglet from one position disposed against and parallel to the second wing portion to another position having a dihedral angle between the at least one winglet and the second wing portion in a range of 0 degrees to 360 degrees.

10. The method of claim 9 wherein the rotating the at least one winglet relative to the wing further comprises a processor using a closed-loop programming code to rotate the at least one winglet relative to the second wing portion based on detected real-time flight conditions or airport space constraints.

11. The method of claim 10 further comprising the closed-loop programming code rotating the at least one winglet relative to the second wing portion based on detected real-time flight conditions or airport space constraints.

12. The method of claim 9 wherein the rotating the at least one winglet relative to the wing further comprises a processor using an open-loop programming code to rotate the at least one winglet relative to the wing a non-pre-determined amount.

13. The method of claim 12 further comprising the open-loop programming code rotating the at least one winglet relative to the wing the non-pre-determined amount based on detected real-time flight conditions or airport space constraints.

* * * * *